United States Patent [19]

Shibaguchi

[11] Patent Number: 5,020,885

[45] Date of Patent: Jun. 4, 1991

[54] OPTICAL ELEMENT

[75] Inventor: Takashi Shibaguchi, Yokohama, Japan

[73] Assignee: Ricoh Company, Ltd., Tokyo, Japan

[21] Appl. No.: 320,613

[22] Filed: Mar. 8, 1989

[30] Foreign Application Priority Data

Mar. 10, 1988 [JP] Japan .................. 63-56766

[51] Int. Cl.$^5$ ..................... G02F 1/01; G02F 2/00; G02B 5/30

[52] U.S. Cl. ........................... 350/355; 350/379

[58] Field of Search .................. 350/355, 379

[56] References Cited

U.S. PATENT DOCUMENTS

| | | | |
|---|---|---|---|
| 3,402,001 | 9/1968 | Fleisher | 350/379 |
| 4,108,622 | 8/1978 | Martin | 350/379 X |
| 4,466,703 | 8/1984 | Nishimoto | 350/388 X |
| 4,576,441 | 3/1986 | Kubick | 350/355 |
| 4,614,408 | 9/1986 | Mir et al. | 350/379 |

FOREIGN PATENT DOCUMENTS

| | | | |
|---|---|---|---|
| 2649073 | 5/1977 | Fed. Rep. of Germany | 350/379 |
| 0611167 | 6/1978 | U.S.S.R. | 350/379 |

Primary Examiner—Eugene R. LaRoche
Assistant Examiner—Michael B. Shingleton
Attorney, Agent, or Firm—Oblon, Spivak, McClelland, Maier & Neustadt

[57] ABSTRACT

An optical element comprising: an electro-optic medium through which a linearly polarized light beam passes; at least one pair of electrodes disposed on the electro-optic medium in such a way that the light beam passes between the electrodes; and a power source for applying an electric voltage to the pair of electrodes. A position and a shape of the electrodes of the pair are settled in such a way that when an electric voltage is applied to the pair of electrodes, the electro-optic medium functions as a lens to converge or diverge the light beam in a predetermined direction.

20 Claims, 6 Drawing Sheets

OPTICAL ELEMENT

BACKGROUND OF THE INVENTION

The present invention relates to an optical element. More particularly, the invention relates to an optical element which electrically functions as a lens using an electro-optic medium.

Technique of optical information processing has been rapidly developed these days, so that it is required to develop an optical element which performs novel functions over the conventional optical elements. For example, an optical element which makes it possible to change the focal distance at a high speed has been required nowadays. For the purpose of achieving such a requirement, there has been developed a variable focal distance lens which is able to change the focal distance thereof by manipulating a mechanical means operationally connected with the lens. However, the conventional variable focal distance lens comprising such a mechanical means for varying the focal distance does not fully satisfy the requirement in the optical information processing field which requires a high speed function of changing the focal distance thereof.

As another means for varying the focal distance of the lens, an electric focal distance varying means is known from the document of Electromagnetic Field Theory Research Group of the Electric Society (EMT-85 No. 16-20, pages 25 to 33). The known electric focal distance varying means comprises a minute refractive index distributed plate type micro lens made from an electro-optic crystal plate in which the refractive index distribution is changed by electo-optic effect of the micro lens so as to vary the focal distance thereof at a high speed.

However, the above mentioned electric focal distance varying means in accordance with the prior art has problems that it is not easy to fabricate the plate type micro lens and that the variable range of the focal distance of the lens is small (about 200 μm).

SUMMARY OF THE INVENTION

It is therefore an object of the present invention to provide a novel optical element which makes it possible to achieve a lens function in one direction by manipulating an electric means without confronting with the above mentioned problems. Another object of the present invention is to provide a novel optical element which makes it possible to achieve a lens function in two directions perpendicular to each other by manipulating an electric means.

The first object of the present invention is achieved by an optical element in accordance with the present invention which is constructed and functions as follows. The optical element comprises an electro-optic medium, at least one pair of electrodes and a device for applying a voltage to the electrodes. A linearly polarized beam is irradiated to the electro-optic medium which functions as a lens in response to the irradiation of the beam. Each of the pair of the electrodes is disposed on the electro-optic medium on either side of the light path of the polarized beam in such a way that the beam is situated between the electrodes. The position and the shape of the electrode are determined so that when a voltage is applied to the electrodes by the voltage applying device, the electro-optic medium functions as a lens which diverges or converges the linearly polarized beam in one direction.

The second object of the present invention is achieved by a complex optical element in accordance with an embodiment of the invention wherein two optical elements of the above mentioned structure of the present invention are disposed along the direction of the polarized beam in such a way that a half wavelength plate is disposed between the two optical elements so that the direction of the lens function of one of the two optical elements is arranged perpendicular to that of the other optical element.

A still further embodiment of the present invention comprises an electro-optic medium, at least one pair of first electrodes, at least another pair of second electrodes and a device for applying a voltage to the electrodes.

A linearly polarized beam is irradiated to the electro-optic medium which functions as a lens in response to the irradiation of the beam thereto. The first pair of the electrodes is disposed on the electro-optic medium in such a way that the beam path is situated between the electrodes. The second pair of the electrodes is disposed behind the first pair of the electrodes. That is, the first electrodes and the second electrodes are disposed along the direction of the beam one behind the other, the beam being situated between the pair of the first electrodes and between the pair of the second electrodes. The position and the shape of the first pair of the electrodes are determined so that when a voltage is applied to the electrodes, the electro-optic medium functions as a lens which converges or diverges the polarized beam along a predetermined direction. Also, the position and the shape of the second electrodes are determined so that when a voltage is applied to the electrodes, the electro-optic medium functions as a lens which converges or diverges the polarized beam in a direction perpendicular to the predetermined direction and to the direction of the beam.

Various electro-optic material such as an electro-optic crystal of PLZT (lead lanthanum zirconate titanate) may be used as the above mentioned electro-optic medium.

When an electric field is applied to the electro-optic medium, the refractive index thereof changes in response to the magnitude of the electric field. The present invention utilizes this function of the electro-optic medium in such a way that the electro-optic medium functions as a lens with respect to the polarized beam due to the distribution of the refractive index which is changed by the electric field by selecting the position and the shape of the electrodes disposed on the electro-optic medium. This function of the electro-optic medium as a lens can be controlled to operate and inoperate by switching on and off the voltage applied to the electrodes. Also, the strength of the function of the lens can be controlled by changing the magnitude of the voltage.

Advantages of the above mentioned novel optical element in accordance with the present invention are that it becomes possible to electrically operate the optical element to function as a lens and that it is possible to adjust the strength of the lens function electrically. Also, the operation and inoperation as well as the control of the function of the lens element are carried out at a very high speed since the lens function is attained by an electric manipulation, which satisfies the requirement of a high speed operation in processing optical informations.

Further objects and advantages of the present invention will be apparent from the following description of the preferred embodiments of the invention as illustrated in the accompanying drawings.

DESCRIPTION OF THE PREFERRED EMBODIMENTS

The present invention is further described below by way of examples of various embodiments of the present invention with reference to the accompanying drawings.

Figure 1A:
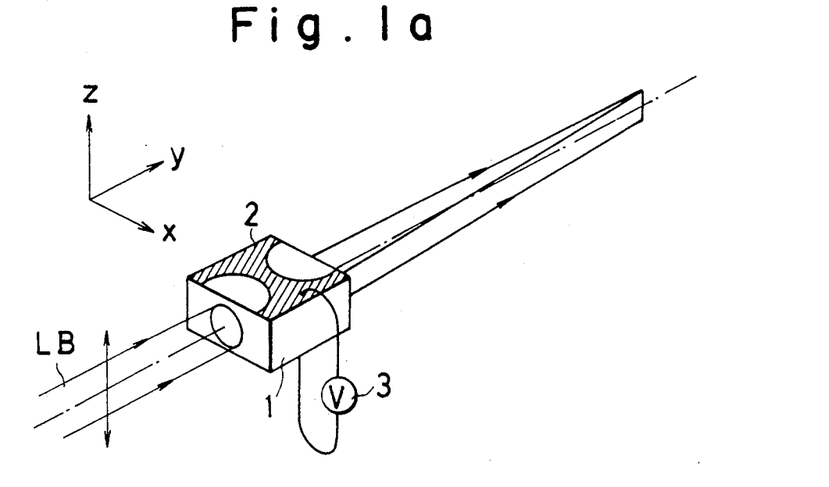
FIGS. 1a and 1b are explanatory views for explaining the structure and function of a first embodiment of the present invention.
Figure 1B:
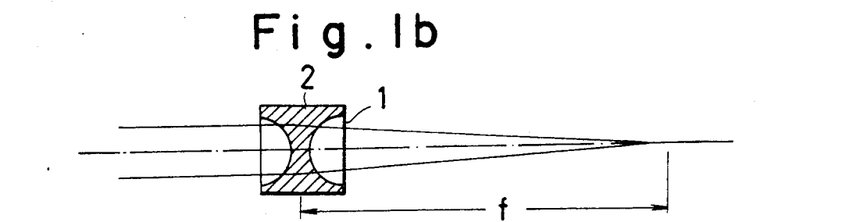

FIGS. 1a and 1b represent a first embodiment of the present invention. In the drawings, numeral 1 designates an electro-optic medium, numeral 2 designates an electrode and numeral 3 designates a voltage power source.

The electro-optic medium 1 is made from an electro-optic crystal material of PLZT (9/65/35) and has a rectangular parallelepiped shape. In an xyz coordinate system as shown in FIG. 1a, a light beam LB passes in the direction of the y axis. The electrode 2 has a shape as shown by hatch lines and disposed on each of the two surfaces (upper surface and rear surface) perpendicular to the z axis. The electrode of the rear surface of the electro-optic medium 1 is not shown in FIG. 1a. The two electrode 2 disposed on the opposite two surfaces of the electro-optic medium 1 constitute a cooperative pair of electrodes and arranged in such a way that the shapes of the two electrodes align with each other when seen through the electro-optic medium 1 from the direction of the z axis.

The voltage power source 3 is arranged as a means for applying a voltage to the pair of electrodes 2.

When an electric field Ez is applied to the electro-optic medium 1 in the direction z, the refractive index thereof is reduced due to the electro-optic effect thereof. More particularly, the refractive index Nz of the electro-optic medium 1 in the portion where the electric field is applied is represented by the following equation.

$$Nz = No\{1 - (\tfrac{1}{2})No^2 R_{33} Ez^2\}$$

wherein No represents the refractive index of the electro-optic medium 1 when the electric field is not applied and $R_{33}$ represents a matrix component of the guadratic electro-optic coefficient. As can be seen from the equation, the refractive index Nz in the portion where the electric field is applied is reduced from the refractive index No in the portion where the electric field is not applied. The reduction ratio is in proportion to the square of the electric field strength Ez.

The function of the first embodiment is as follows. The light beam LB which is linearly polarized in the direction z is irradiated to the electro-optic medium 1 in a form of parallel beam, as illustrated in FIG. 1a. When the electric voltage is not applied to the pair of electrodes 2, the light beam LB passes through the electro-optic medium 1 in the direction y without being acted by the electro-optic effect therefrom so that the form of the parallel beam is not changed. On the other hand, when the electric voltage is applied to the pair of the electrodes, the portion of the electro-optic medium situated between the electrodes is influenced by the electric field which induces the electro-optic effect in the electro-optic medium so that the refractive index thereof is reduced. Referring to FIG. 1b, the refractive index of the hatched portion of the electro-optic medium becomes smaller than that of the unhatched portions. Therefore, each of the unhatched semicircular portions constitutes a cylindrical lens having a lens function power in the direction x. The two cylindrical lenses are arranged in such a way that the convex portions thereof face to each other, each functioning as a lens in the direction x so that the light beam LB is influenced by the lens function and converged in the direction x, as illustrated in FIG. 1b, when the electric field is applied to the pair of electrodes formed on the electro-optic medium. When the shape of the electrode is determined, the focal distance f of this lens structure depends only on the voltage applied thereto with respect to the shape of the electrode.

As a variant of this first embodiment of the present invention, the electrode may be disposed on the unhatched portions in the form of a semicircle instead of on the hatched portion, in FIG. 1b, so that the refractive index of the hatched portion becomes larger than that of the unhatched semicircle portion. With such an arrangement, a cylindrical lens having a sectional shape of the hatched portion is formed between the pair of upper and lower electrodes which lens has a negative lens function power. Accordingly, the light beam LB passing through the lens structure in the direction y is diverged in the direction x due to the lens function thereof.

Figure 2A:
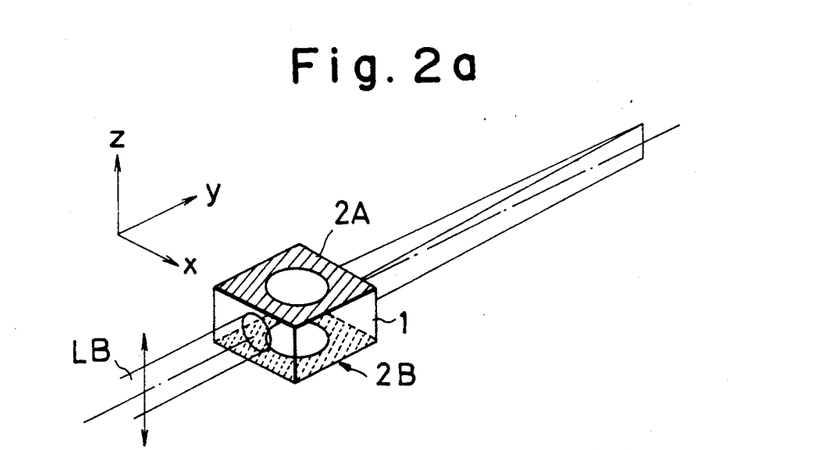
FIGS. 2a and 2b are explanatory views for explaining the structure and function of a second embodiment of the present invention.
Figure 2B:
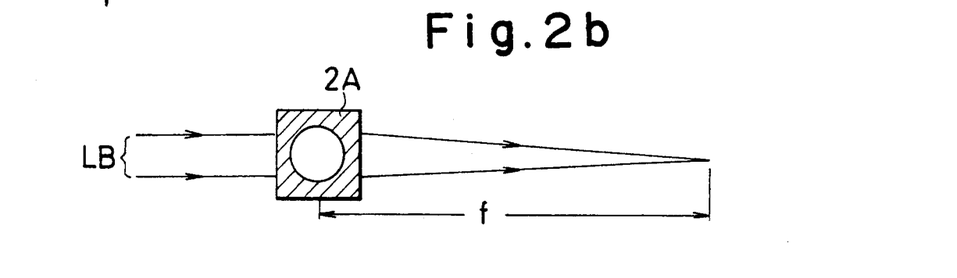

FIGS. 2a and 2b illustrate a second embodiment of the present invention. This second embodiment also comprises an electro-optic medium 1 as the first embodiment. Electrodes 2A and 2B which constitute a cooperative pair of electrodes have a same shape and disposed on the opposite surfaces of the electro-optic medium 1 which surfaces are perpendicular to the direction z so that the two electrodes are aligned with each other when seen from the direction z through the electro-optic medium 1.

The electrodes are represented by hatch lines. When an electric voltage is applied to the pair of electrodes by a not shown voltage power source to generate an electric field between the pair of electrodes in the direction z, a light beam LB which is linearly polarized in the direction z is converged in the direction x in the same manner as in the above mentioned first embodiment of FIGS. 1a and 1b. In other words, the electro-optic medium 1 acts as a cylindrical lens having a lens function power in the direction x in cooperation with the pair of electrodes to constitute a lens structure. The focal distance f of this lens structure can be changed by changing the voltage applied to the electrodes.

On the other hand, if the electrodes are formed on the unhatched circle portions on the upper and lower surfaces of the photoelectrode 1 illustrated in FIG. 2a, the lens structure functions to diverge the light beam LB in the direction x instead of converging the beam as illustrated in FIG. 2b.

Figures 3A, 3B:
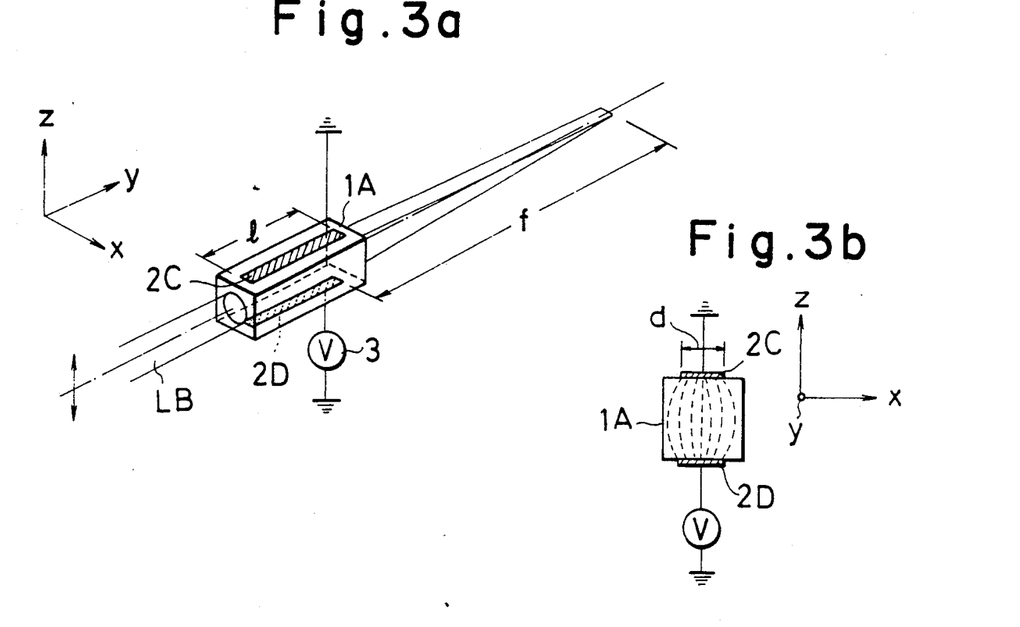
FIGS. 3a and 3b are explanatory views for explaining the structure and function of a third embodiment of the present invention.

In FIGS. 3a and 3b, a third embodiment of the present invention is illustrated. An electro-optic medium 1A is made from the same material as the above mentioned first and second embodiments and formed in a longitudinal rectangular parallelepiped shape as illustrated in FIG. 3a. A pair of electrodes 2C and 2D is disposed on both surfaces which are perpendicular to the direction z, i.e., an upper surface and a lower surface in the drawings. Each of the electrodes is formed in a shape of a longitudinal narrow strip extending along the direction y. The electrodes 2C and 2D are arranged in such a way that the two electrodes align with each other when seen from the direction z through the electro-optic medium.

A voltage power source 3 is arranged as a means for applying an electric voltage to the pair of electrodes 2C and 2D. When a voltage is applied to the pair of electrodes, an electric field is generated in the electro-optic medium between the electrodes, as illustrated in FIG. 3b. As can be seen from FIG. 3b, the electric field is strong in the upper end portion and lower end portion of the electro-optic medium since the density of the electric flux lines is high in the vicinity of the electrodes formed on the upper and lower end surface of the electro-optic medium, whereas the electric field is weak in the middle portion of the electro-optic medium since the density of the electric flux is low in the center portion of the electro-optic medium between the electrodes.

In accordance with the above mentioned arrangement of the electrodes, by applying an electric voltage to the pair of electrodes to generate an electric field therebetween, the parallel light beam LB which is linearly polarized in the direction z is converged in the direction z due to the cylindrical lens function of the electro-optic medium having a lens function power in the direction z, since the refractive index of the electro-optic medium is large in the middle portion thereof in comparison to that of the end portions thereof near the electrodes 2C and 2D.

The focal distance f of the above mentioned lens structure is determined depending on the width d and the length l of each of the electrodes 2C and 2D and the voltage V applied to the electrodes. The lens function is enhanced according as the voltage is increased and the length is elongated so that the focal distance f is shortened.

Figure 4A:
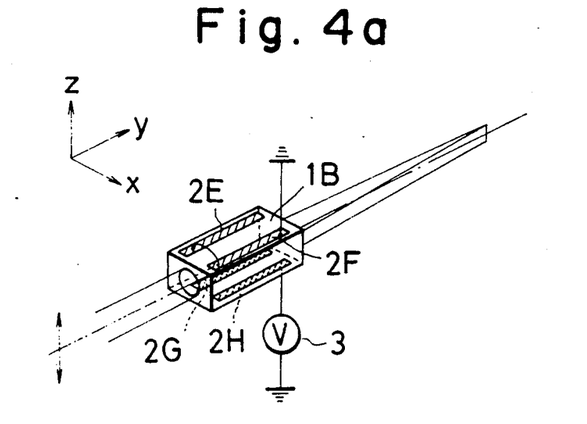
FIGS. 4a and 4b are explanatory views for explaining the structure and function of a fourth embodiment of the present invention.
Figure 4B:
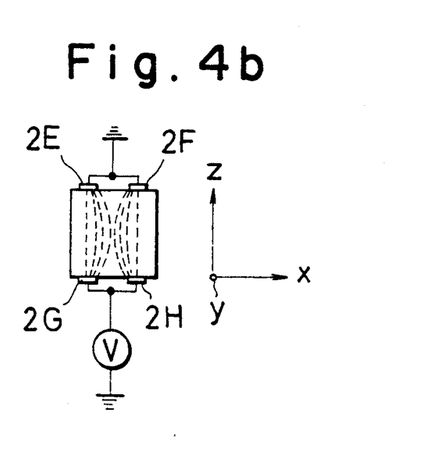

In FIGS. 4a and 4b, a fourth embodiment of the present invention is illustrated. This fourth embodiment comprises an electro-optic medium 1B which has the same shape as the third embodiment of FIG. 3a and which is made from the same electro-optic material as the above mentioned embodiments.

The fourth embodiment comprises two pairs of electrodes, that is, four electrodes 2E, 2F, 2G and 2H each of which has a shape of a longitudinal narrow strip extending in the direction y. The electrodes 2E and 2F are disposed on one of the surfaces which are perpendicular to the direction z, that is, an upper surface of the electro-optic medium 1B in the drawing, in parallel to each other, as illustrated in FIG. 4a. On the other hand, the electrodes 2G and 2H are disposed on the opposite surface (the lower surface in the drawings) of the electro-optic medium 1B in parallel to each other. The two pairs of electrodes are arranged in such a way that the electrodes 2E and 2G mate together to constitute a pair of electrodes and align with each other when seen from the direction z through the electro-optic medium 1B and that the other electrodes 2F and 2H mate together to constitute another pair of electrodes and align with each other when seen from the direction z through the electro-optic medium 1B. The electrodes 2E and 2F formed on the upper surface are interconnected with each other. Also, the electrodes 2G and 2H formed on the lower surface are interconnected with each other. When an electric voltage is applied to the pairs of electrodes from the voltage power source 3, electric flux lines are generated in the electro-optic medium as illustrated in dash lines in FIG. 4b so that the electro-optic medium acts as a cylindrical lens which has a positive lens function power in the direction x. Therefore, the light beam LB which is linearly polarized in the direction z is converged in the direction x when passing through the electro-optic medium 1B along the direction y as illustrated in FIG. 4a. The focal distance of this lens structure is shortened according as the length of each of the electrodes 2E,2F,2G and 2H is elongated and the voltage applied to the electrodes is heightened.

Figure 5:
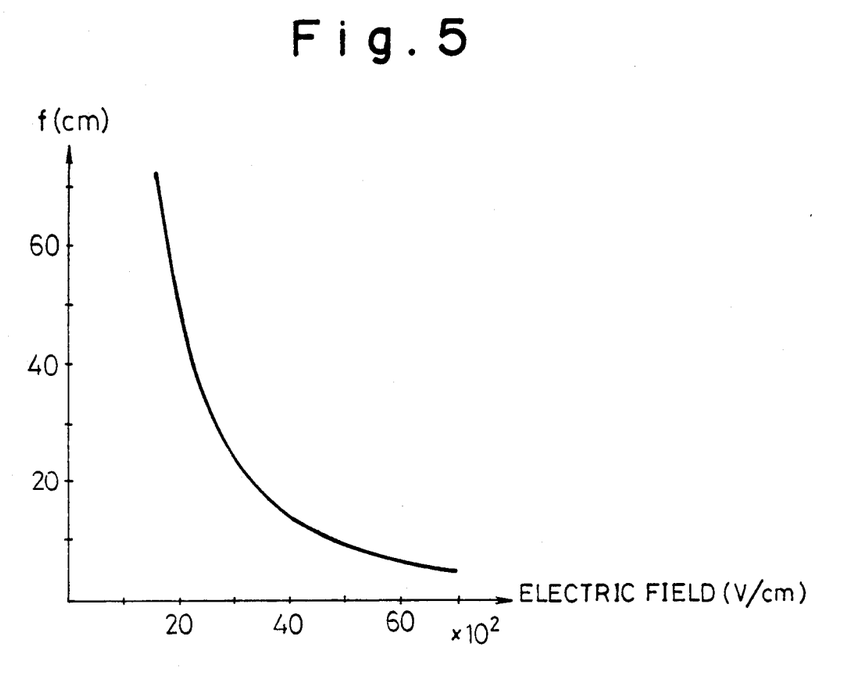
FIG. 5 is a graphical view representing relation between strength of the electric field generated by applying a voltage from a power source and the focal distance in accordance with the embodiment of FIGS. 3a and 3b.

FIG. 5 represents the relationship between the focal distance and the electric field generated by applying the voltage to the electrodes of the embodiment of FIG. 3 from the voltage power source 3 in which the measurement was carried out with respect to the electrode having a length 8 mm and a width 0.5 mm.

Figure 6:
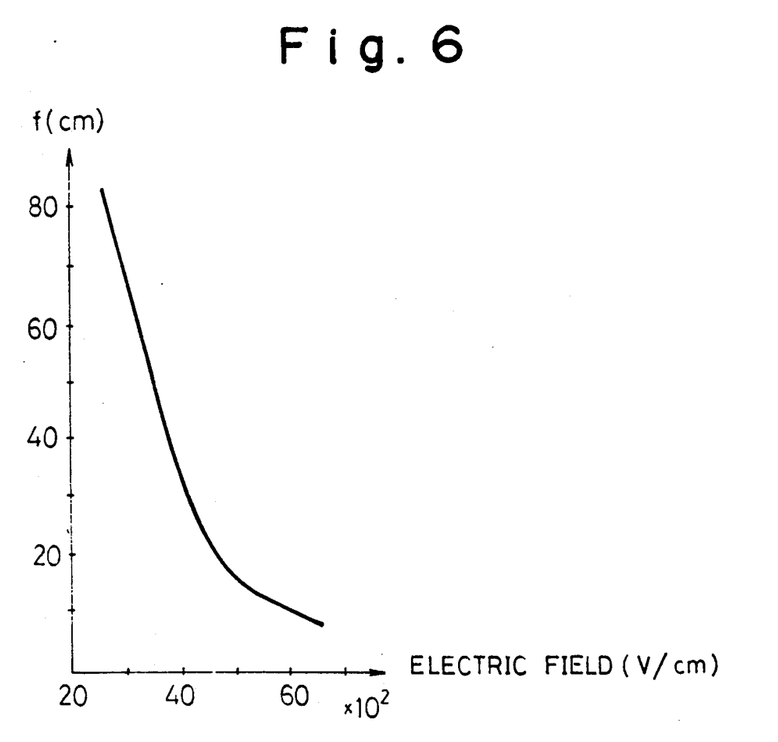
FIG. 6 is a graphical view representing relation between strength of the electric field generated by applying a voltage from a power source and the focal distance in accordance with the embodiment of FIGS. 4a and 4b.

FIG. 6 represents the relationship between the focal distance and the electric field generated by applying the voltage to the electrodes of the embodiment of FIG. 4 from the voltage power source 3 in which the length of the electrode is 8 mm and the gap between the electrodes 2E and 2F is 1.5 mm. In the region where the electric field is weak the focal distance changes linearly, whereas in the region where the electric field is more than 4000 V/cm the focal distance is represented by a curve line which gradually descends toward the high electric field side.

Figure 7:
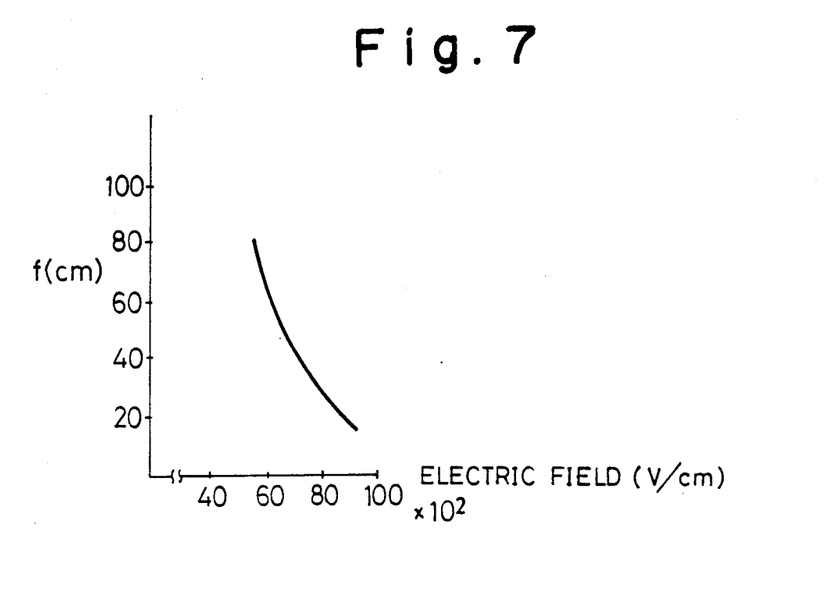
FIG. 7 is a graphical view representing relation between strength of the electric field generated by applying a voltage from a power source and the focal distance in accordance with the embodiment of FIGS. 2a and 2b.

FIG. 7 represents the relationship between the focal distance and the electric field generated by applying the voltage to the electrodes of the embodiment of FIGS. 2a and 2b from the voltage power source in which the diameter of the circular region of the electrodes 2A and 2B is 2 mm.

FIGS. 8 to 11 represent a fifth to an eighth embodiments of the present invention, respectively. These embodiments realize a complex optical element which comprises two optical elements of the above mentioned structure of the first to fourth embodiments assembled with each other together with a half wavelength plate disposed between the optical elements.

Figure 8:
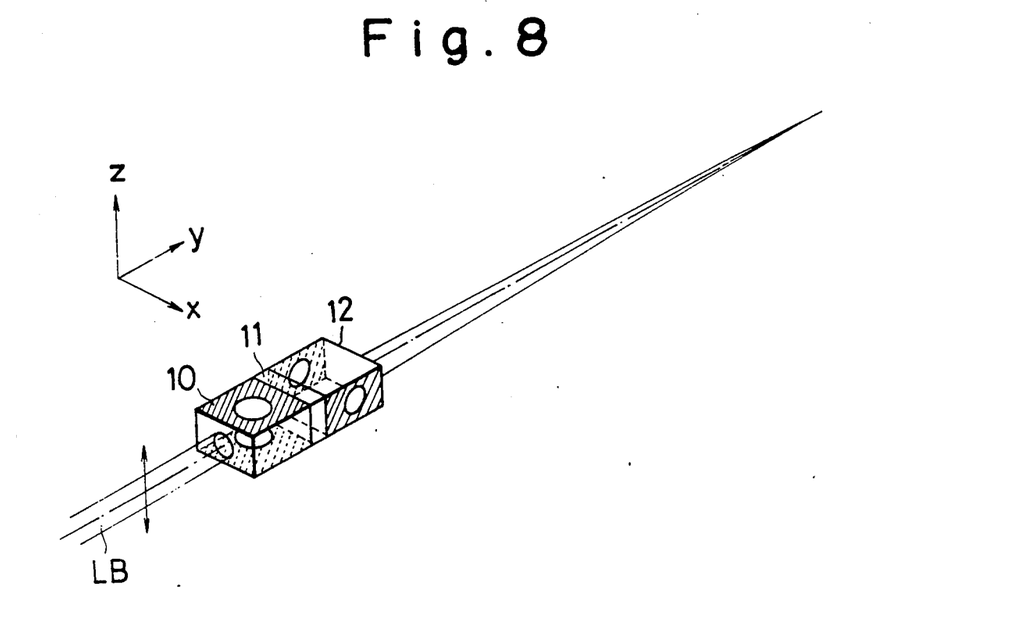
FIG. 8 is an explanatory view for explaining the structure and function of a fifth embodiment of the present invention.

FIG. 8 illustrates a fifth embodiment of the present invention comprising two optical elements 10 and 12 disposed along the direction y and a half wavelength plate 11 disposed between the two optical elements. The optical elements 10 and 12 are of the same type of structure as the embodiment of FIGS. 2a and 2b. With regard to one of the optical elements 12, the pair of electrodes is formed on the side surfaces of the electro-optic medium which are perpendicular to the direction x. When an electric voltage is applied to the pairs of electrodes, the optical element assembly of this fifth embodiment functions to the light beam LB as follows which beam is linearly polarized in the direction z and passes therethrough along the direction y. First, the light beam LB is converged in the direction x by the lens function of the optical element 10. After that, the light beam converged in the direction x is acted by the half wavelength plate 11 which changes the polarization direction of the light beam from the direction z to the direction x. Accordingly, the light beam is then converged in the direction z by the lens function of the optical element 12 during passing therethrough. In such a manner, the light beam LB is converged in two directions, i.e., the direction x and the direction z, perpendicular to each other after passing through the optical element assembly. By changing the magnitude of the voltage applied to the two pairs of electrodes, respectively, it is possible to converge the light beam to a point as illustrated in FIG. 8, or intentionally generate astigmatism. Also, it is possible to selectively converge the light beam in one direction by applying the voltage to only one of the two pairs of electrodes.

Figure 9:
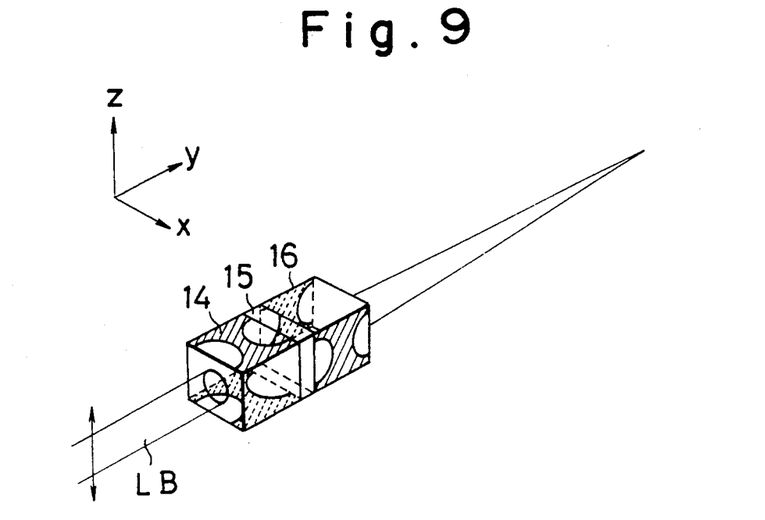
FIG. 9 is an explanatory view for explaining the structure and function of a sixth embodiment of the present invention.

FIG. 9 represents a sixth embodiment of the present invention which is constructed as a lens assembly comprising two optical elements 14 and 16 which are of the same type of structure as the embodiment of FIGS. 1a and 1b and disposed along the direction y one after the other and a half wavelength plate 15 disposed between the two optical elements 14 and 16. The light beam LB passes through the assembly of the optical elements in the direction y. The optical element 14 functions to converge the light beam LB in the direction x, whereas the optical element 16 functions to converge the light beam LB in the direction z. Therefore, by changing the magnitude of the voltage applied to the two pairs of electrodes, respectively, in the same way as in the embodiment of FIG. 8, it is possible to converge the light beam LB to a spotting point or intentionally generate astigmatism. Also, it is possible to select the converging direction of the light beam LB by selectively applying the voltage to only one of the two pairs of the electrodes, as in the embodiment of FIG. 8.

Figure 10:
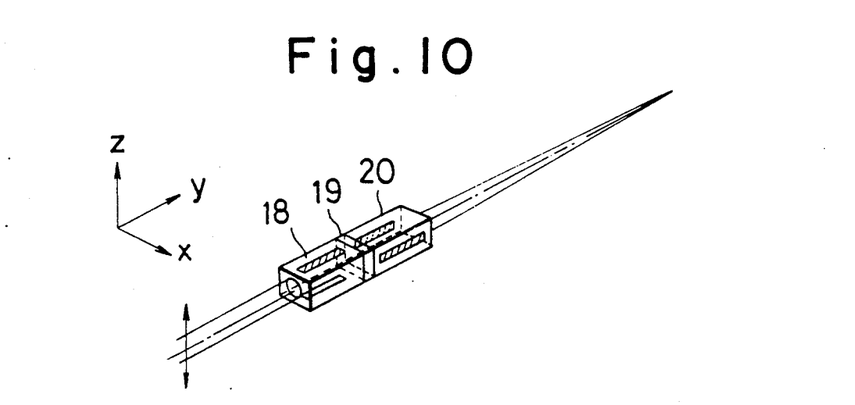
FIG. 10 is an explanatory view for explaining the structure and function of a seventh embodiment of the present invention.

FIG. 10 represents a seventh embodiment of the present invention which is constructed as a lens assembly comprising two optical elements 18 and 20 which are of the same type of structure as the embodiment of FIGS. 3a and 3b disposed along the direction y one after the other and a half wavelength plate 19 disposed between the two optical elements 18 and 20. The optical element 18 functions to converge the light beam in the direction z, whereas the optical element 20 functions to converge the light beam in the direction x. Therefore, by changing the magnitude of the voltage applied to the two pairs of electrodes, respectively, in the same way as in the embodiment of FIG. 8, it is possible to converge the light beam to a spotting point or intentionally generate astigmatism. Also, it is possible to select the converging direction of the light beam by selectively applying the voltage to only one of the two pairs of the electrodes, as in the embodiment of FIG. 8.

The magnitude of the lens function of each optical element corresponds to the length of the electrode thereof. For example, if the length of the electrode of the optical element 20 is longer than that of the optical element 18, the lens function of the optical element 20 becomes stronger than that of the optical element 18. Therefore, it is possible to converge the light beam to a point with the same voltage applied to the pairs of electrodes of the optical elements 18 and 20.

Figure 11:
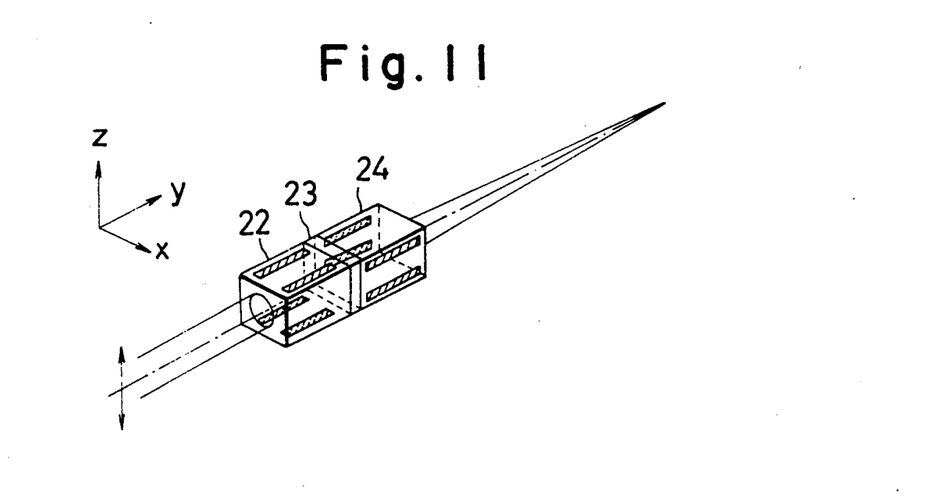
FIG. 11 is an explanatory view for explaining the structure and function of a eighth embodiment of the present invention.

FIG. 11 represents an eighth embodiment of the present invention which is constructed as a lens assembly comprising two optical elements 22 and 24 which are of the same type of structure as the embodiment of FIGS. 4a and 4b disposed along the direction y one after the other and a half wavelength plate 23 disposed between the two optical elements 22 and 24. The optical element 22 functions to converge the light beam in the direction x, whereas the optical element 24 functions to converge the light beam in the direction z. Therefore, by changing the magnitude of the voltage applied to the two pairs of electrodes, respectively, in the same way as in the embodiment of FIG. 8, it is possible to converge the light beam to a spotting point or intentionally generate astigmatism. Also, it is possible to select the converging direction of the light beam by selectively applying the voltage to only one of the two pairs of the electrodes, as in the embodiment of FIG. 8.

The magnitude of the lens function of each optical element corresponds to the length of the electrode thereof. For example, if the length of the electrode of the optical element 22 is longer than that of the optical element 24, the lens function of the optical element 22 becomes stronger than that of the optical element 24. Therefore, it is possible to converge the light beam to a point with the same voltage applied to the pairs of electrodes of the optical elements 22 and 24, as in the case of the embodiment of FIG. 10.

With regard to the above mentioned four examples of the fifth to the eighth embodiments of the present invention illustrated in FIGS. 8 to 11, respectively, each example comprises an integral optical element assembly formed as one body comprising two optical elements and a half wavelength plate. However, the present invention is not limited to those embodiments. The optical element assembly of the present invention may comprise separatedly assembled optical elements and a half wavelength plate arranging a gap between the components. Besides, it is possible to constitute the optical element assembly in such a way that the gap between the optical elements and the half wavelength plate is variable so that the focal distance of the optical element assembly can be changed by adjusting the gap thereof.

Figure 12:
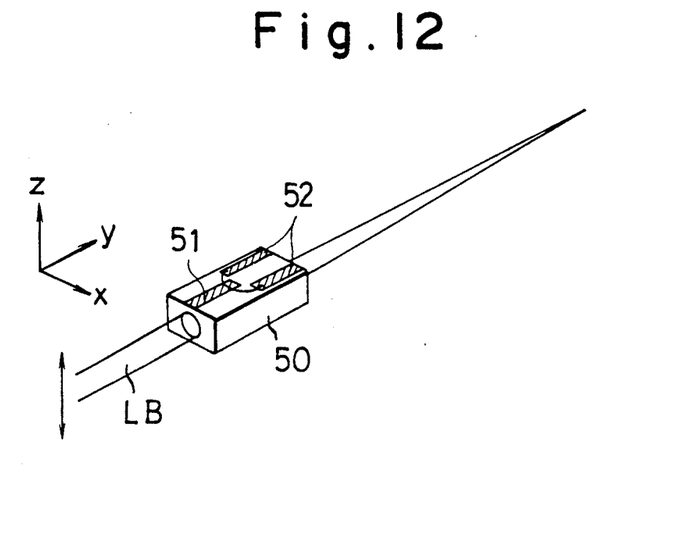
FIG. 12 is an explanatory view for explaining the structure and function of a ninth embodiment of the present invention.
Figure 13:
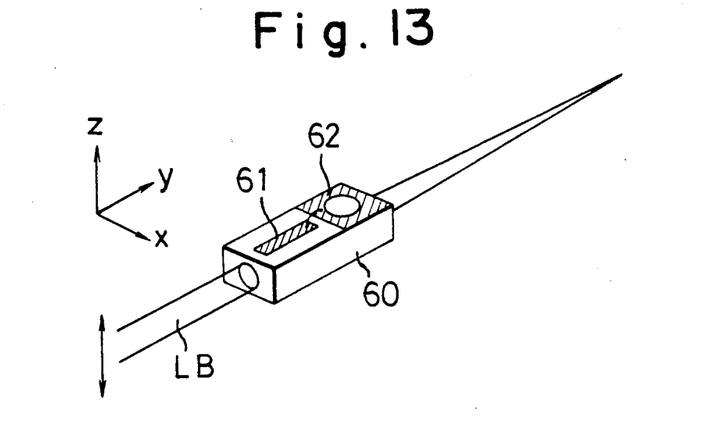
FIG. 13 is an explanatory view for explaining the structure and function of a tenth embodiment of the present invention.

FIGS. 12 and 13 illustrate a ninth and a tenth embodiments of the present invention. These embodiments comprise an optical element which functions as a lens in two directions.

The embodiment of FIG. 12 comprises a rectangular parallelepiped electro-optic medium 50 and three pairs of electrodes formed on each of opposite two surfaces of the electro-optic medium which surfaces are perpendicular to the direction z as illustrated in the drawing. To be more precise, one pair of strip shaped electrodes 51 are formed on an upper and a lower surfaces of the electro-optic medium on an inlet side of the light beam LB in the direction y which beam is linearly polarized in the direction z, the electrodes 51 being arranged in the same manner as in the embodiment of FIGS. 3a and 3b (electrode of the lower surface is not illustrated), whereas two pairs of strip shaped electrodes 52 are formed on the same surface of the electro-optic medium on an outlet side of the light beam LB in the direction y, in the same manner as in the embodiment of FIGS. 4a and 4b. The three electrodes formed on each of the upper and lower surfaces are interconnected with each other so that a same voltage is applied to the three pairs of the electrodes. The pair of electrodes 51 functions as a lens to converge the light beam in the direction z. On the other hand, the two pairs of the electrodes 52 function as a lens to converge the light beam in the direction x. In accordance with this embodiment, the light beam LB is converged to a point due to the lens functions in directions x and z, respectively, acting on the beam during passing through the electro-optic medium.

FIG. 13 illustrates a tenth embodiment of the present invention. This embodiment comprises a rectangular parallelepiped electro-optic medium 60 and two pairs of electrodes 61 and 62 formed on two surfaces (upper and lower surfaces in the drawing) of the electro-optic medium 60 which surfaces are perpendicular to the direction z. To be more precise, a pair of strip shaped electrodes 61 is formed in the same manner as in the embodiment of FIGS. 3a and 3b on the upper and lower surfaces of the electro-optic medium 60 on an inlet side of the linearly polarized light beam LB which is linearly polarized in the direction z and passes through the electro-optic medium 60 along the direction y (electrode on the lower surface of the electro-optic medium is not shown), whereas a pair of electrodes 62 is formed in the same manner as in the embodiment of FIGS. 2a and 2b on the upper and lower surfaces of the electro-optic medium 60 on an outlet side of the light beam LB (electrode on the lower surface of the electro-optic medium is not shown). The electrodes 61 and 62 formed on each surface are interconnected with each other on the respective surface to apply a same voltage to each of the pairs of the electrodes 61 and 62. The pair of electrodes 61 functions as a lens to converge the light beam in the direction z, while the pair of electrodes 62 functions as a lens to converge the light beam in the direction x, so that the light beam LB is converged to a point due to the lens functions in the two directions x and z acting on the light beam during passing through the electro-optic medium 60. The voltage may be independently applied to each of the pairs of electrodes so as to selectively control the lens function of the electro-optic medium due to the electric field between the electrodes.

The above mentioned embodiments with reference to FIGS. 8 to 13 are constructed in such a way that the lens function thereof is to converge the light beam. However, the invention is not limited to such a construction but may be constructed to function as a diverging lens. Also, it is possible to combine the diverging function and the converging function by selecting any type of electrode pair and combining the pair with any of the same type and the other types of electrode pair.

Figure 14:
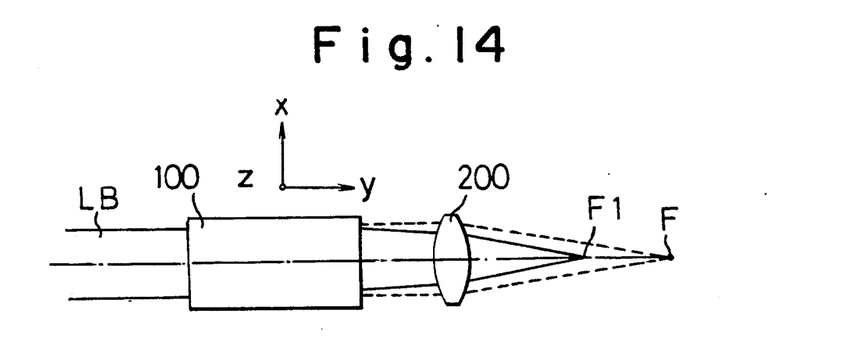
FIG. 14 is an explanatory view of a lens assembly in which the optical element in accordance with the present invention is used.

Also, the optical element in accoordance with the present invention can be combined with a normal optical lens, as illustrated in FIG. 14. In the drawing, numeral 100 designates an optical element in accordance with any of the above mentioned embodiments of the present invention and numeral 200 designates an optical lens which may be a diverging lens, a converging lens or a cylindrical lens. In accordance with the structure of the optical element 100 of the present invention in combination with the optical lens 200, when the optical element is not supplied with the electric voltage, the light beam LB is acted by the lens function only from the optical lens 200, whereas when the voltage is applied to the optical element 100, the light beam LB is acted by the lens function from the optical element 100 as well as from the optical lens 200. For example, on the condition that the optical structure of FIG. 12 is used as the optical element 100 and a converging lens is used as the optical lens 200, when the voltage is not applied to the optical element 100, the light beam LB converges to the focal point of the optical lens 200, while when the voltage is applied to the optical element 100, the light beam LB converges to a point F1 due to the lens function of the optical element 100 in addition to the converging lens function of the lens 200. Therefore, by the above mentioned way, the diverging point of the light beam is shifted after passing through the whole structure of the optical element assembly so that the apparent focal distance of the optical lens 200 can be changed.

Instead of combining the optical element with the optical lens as mentioned above, it is possible to constitute the electro-optic medium in such a way that the inlet and/or the outlet thereof for the light beam is formed to have a shape of a lens surface so that the optical element itself constitutes an optical lens in addition to the electrically operative structure.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical element having a lens function, comprising:

an electro-optic medium having a parallelepiped shape and permitting a linearly polarized light beam to pass therethrough;

a pair of electrodes disposed respectively on two opposite surfaces of said electro-optic medium in such a manner as to be opposite to each other, said two opposite surfaces extending along the optical axis of said light beam, each of said electrodes having a shape of rectangle from which a circle is removed from a central portion of said rectangle; and a power source electrically connected to a pair of electrodes for applying a voltage to a pair of said electrodes.

2. An optical element according to claim 1, wherein said electro-optic medium is made of a substance capable of generating a quadratic electro-optic effect.

3. An optical element having a lens function, comprising:

an electro-optic medium having a parallelepiped shape and permitting a linearly polarized light beam to pass therethrough;

a pair of electrodes disposed respectively on two opposite surfaces of said electro-optic medium in such a manner as to be opposite to each other, each of said electrodes having a shape of circle, said two opposite surfaces extending along the optical axis of said light beam; and a power source electrically connected to a pair of electrodes for applying a voltage to a pair of said electrodes.

4. An optical element according to claim 3, wherein said electro-optic medium is made of a substance capable of generating a quadratic electro-optic effect.

5. An optical element having a lens function, comprising:

an electro-optic medium having a parallelepiped shape and permitting a linearly polarized light beam to pass therethrough;

a pair of electrodes disposed respectively on two opposite surfaces of said electro-optic medium in such a manner as to be opposite to each other, each of said electrodes having a shape of a longitudinal strip extending along the optical axis of said light beam, said two opposite surfaces extending along said optical axis; and a power source electrically connected to a pair of said electrodes for applying a voltage to a pair of said electrodes.

6. An optical element according to claim 5, wherein said electro-optic medium is made of a substance capable of generating a quadratic electro-optic effect.

7. An optical element having a lens function, comprising:

an electro-optic medium having a parallelepiped shape and permitting a linearly polarized light beam to pass therethrough;

a pair of first electrodes disposed respectively on two opposite surfaces of said electro-optic medium on an incident side of said light beam in such a manner as to be opposite to each other, each of said first electrodes having a shape of a longitudinal strip extending along the optical axis of said light beam, said two opposite surfaces extending along said optical axis;

a pair of second electrodes disposed respectively on said two opposite surfaces on an exit side of said light beam in such a way that said second electrodes are opposite to each other and offset on one side of a perpendicular direction to said optical axis with respect to said first electrodes, each of said second electrodes having a shape of a longitudinal strip extending along said optical axis;

a pair of third electrodes disposed respectively on said two opposite surfaces on said exit side in such a way that said third electrodes are opposite to each other and offset on the other side of said perpendicular direction with respect to said first electrodes, each of said third electrodes having a shape of a longitudinal strip extending along said optical axis, one of said first electrodes disposed on one surface of said two opposite surfaces being electrically connected to one of said second electrodes disposed on said one surface and one of said third electrodes disposed on said one surface, the other of said first electrodes disposed on the other surface of said two opposite surfaces being electrically connected to the other of said second electrodes disposed on said other surface and the other of said third electrodes disposed on said other surface; and a power source electrically connected to one of said first to third electrodes disposed on said one surface and one of said first to third electrodes disposed on said other surface for applying a voltage to pairs of said first to third electrodes.

8. An optical element according to claim 7, wherein said electro-optic medium is made of a substance capable of generating a quadratic electro-optic effect.

9. An optical element having a lens function, comprising:

an electro-optic medium having a parallelepiped shape and permitting a linearly polarized light beam to pass therethrough;

a pair of first electrodes disposed respectively on two opposite surfaces of said electro-optic medium on an incident side of said light beam in such a manner as to be opposite to each other, each of said first electrodes having a shape of a longitudinal strip extending along the optical axis of said light beam, said two opposite surfaces extending along said optical axis;

a pair of second electrodes disposed respectively on said two opposite surfaces on an exit side of said light beam in such a manner as to be opposite to each other, each of said second electrodes having a shape of rectangle from which a circle is removed from a central portion of said rectangle, one of said first electrodes disposed on one surface of said two opposite surfaces being electrically connected to one of said second electrodes disposed on said one surface, the other of said first electrodes disposed on the other surface of said two surfaces being electrically connected to the other of said second electrodes disposed on said other surface; and a power source electrically connected to one of said first and second electrodes disposed on said one surface and one of said first and second electrodes disposed on said other surface for applying a voltage to pairs of said first and second electrodes.

10. An optical element according to claim 9, wherein said electro-optic medium is made of a substance capable of generating a quadratic electro-optic effect.

11. A complex optical element having a lens function, comprising:

a first electro-optic medium having a parallelepiped shape and permitting a linearly polarized light beam to pass therethrough:

a second electro-optic medium having parallelepiped shape and permitting a linearly polarized light beam to pass therethrough, said second electro-optic medium being arranged on the optical axis of said light beam coaxially with said first electro-optic medium;

a pair of first electrodes disposed respectively on two opposite surfaces of said first electro-optic medium in such a manner as to be opposite to each other, said two opposite surfaces extending along said optical axis and facing to each other with respect to a predetermined direction crossing perpendicularly to said optical axis, each of said first electrodes having a shape of rectangle from which a circle is removed from a central portion of said rectangle;

a pair of second electrodes disposed respectively on two opposite surfaces of said second electro-optic medium in such a manner as to be opposite to each other, said two opposite surfaces extending along said optical axis and facing to each other with respect to a direction crossing perpendicularly to said predetermined direction and said optical axis, each of said second electrodes having a shape of rectangle from which a circle is removed from a central portion of said rectangle;

a first power source electrically connected to a pair of said first electrodes for applying a voltage to a pair of said first electrodes;

a second power source electrically connected to a pair of said second electrodes for applying a voltage to a pair of said second electrode; and means disposed between said first electro-optic medium and said second electro-optic medium for rotating a polarization direction of said light beam by 90°.

12. A complex optical element according to claim 11, wherein said first electro-optic medium, said second electro-optic medium and said rotating means are respectively arranged separately from one another.

13. A complex optical element according to claim 11, wherein said rotating means is connected integrally with said first electro-optic medium and said second electro-optic medium.

14. A complex optical element according to claim 11, wherein said first and second electro-optic mediums are made of a substance capable of generating a quadratic electro-optic effect.

15. A complex optical element according to claim 11, wherein said rotating means in a half wavelength plate.

16. A complex optical element having a lens function, comprising:

a first electro-optic medium having a parallelepiped shape and permitting a linearly polarized light beam to pass therethrough;

a second electro-optic medium having a parallelpiped shape and permitting a linearly polarized light beam to pass therethrough, said second electro-optic medium being arranged on the optical axis of said light beam coaxially with said first electro-optic medium;

a pair of first electrodes disposed respectively on two opposite surfaces of said first electro-optic medium in such a manner as to be opposite to each other, said two opposite surfaces extending along said optical axis and facing to each other with respect to a predetermined direction crossing perpendicularly to said optical axis, each of said first electrodes having a shape of longitudinal strip extending along said optical axis;

a pair of second electrodes disposed respectively on two opposite surfaces of said second electro-optic medium in such a manner as to be opposite to each other, said two opposite surfaces extending along said optical axis and facing to each other with respect to a direction crossing perpendicularly to said predetermined direction and said optical axis, each of said second electrodes having a shape of longitudinal strip extending along said optical axis;

a first power source electrically connected to a pair of said first electrodes for applying a voltage to a pair of said first electrodes;

a second power source eletrically connected to a pair of said second electrodes for applying a voltage to a pair of said second electrodes; and means disposed between said first electro-optic medium and said second electro-optic medium for rotating a polarization direction of said light beam by 90°.

17. A complex optical element according to claim 16, wherein said first electro-optic medium, said second electro-optic medium and said rotating means are respectively arranged separately from one another.

18. A complex optical element according to claim 16, wherein said rotating means is connected integrally with said first electro-optic medium and said second electro-optic medium.

19. A complex optical element according to claim 16, wherein said first and second electro-optic medium are made of a substance capable of generating a quadratic electro-optic effect.

20. A complex optical element according to claim 16, wherein said rotating means is a half wavelength plate.

* * * * *